United States Patent

Baumanis et al.

[11] Patent Number: 5,413,802
[45] Date of Patent: May 9, 1995

[54] MEAT PRODUCTS CONTAINING GELLING AGENTS

[75] Inventors: Paul J. Baumanis, Marple; Ian T. Norton, Rushden; Charles R. Brown, Bedford; Jeffrey Underdown, Wellingborough, all of Great Britain

[73] Assignee: Thomas J. Lipton Co., Division of Conopco, Inc., Englewood Cliffs, N.J.

[21] Appl. No.: 148,473

[22] Filed: Nov. 8, 1993

[30] Foreign Application Priority Data

Nov. 9, 1992 [EP] European Pat. Off. ............ 92310223

[51] Int. Cl.6 .................. A23L 1/0522; A23L 1/0532; A23L 1/314; A23L 1/317
[52] U.S. Cl. .................................... 426/574; 426/578; 426/642; 426/644; 426/646
[58] Field of Search ............... 426/574, 641, 643, 644, 426/646, 578

[56] References Cited

U.S. PATENT DOCUMENTS

| 3,023,104 | 2/1962 | Battista . | |
|---|---|---|---|
| 4,143,164 | 3/1979 | Shanbhag et al. | 426/104 |
| 4,376,134 | 3/1983 | Kumar | 426/656 |
| 4,427,704 | 1/1984 | Cheney et al. | 426/574 X |
| 4,504,515 | 3/1985 | Hohenester et al. | 426/641 |
| 4,557,942 | 12/1985 | Goodman | 426/578 X |
| 4,844,922 | 7/1989 | Uemura et al. | 426/574 X |
| 4,894,250 | 1/1990 | Musson et al. | 426/574 X |

FOREIGN PATENT DOCUMENTS

| 0050006 | 4/1982 | European Pat. Off. . |
| 0290251 | 11/1988 | European Pat. Off. . |
| 0298561 | 1/1989 | European Pat. Off. . |
| 0325315 | 7/1989 | European Pat. Off. . |
| 0437360 | 7/1991 | European Pat. Off. . |
| 0486936 | 5/1992 | European Pat. Off. . |

OTHER PUBLICATIONS

PCT Search Report.

*Primary Examiner*—Arthur L. Corbin
*Attorney, Agent, or Firm*—James J. Farrell

[57] ABSTRACT

A meat product comprising a meat phase and an aqueous phase, said aqueous phase comprising at least two gelling agents which form at least two distinct gelled phases, each gelling agent having a gel-melting temperature of at least 40° C.

8 Claims, No Drawings

MEAT PRODUCTS CONTAINING GELLING AGENTS

TECHNICAL FIELD OF INVENTION

The present invention relates to meat products. In particular the present invention relates to processed meat products, having highly desirable appearance, taste and cooking performance characteristics. A preferred embodiment of the invention relates to low fat meat products.

BACKGROUND OF THE INVENTION

The prior art has adopted a number of approaches in attempts to reduce the fat and cholesterol content of prepared meat products. One such approach is found in U.S. Pat. No. 3,023,104 wherein the desired results are obtained by simply extending conventional products through the addition of crystallite aggregates of cellulose; the cellulose being inert, the resulting product has less of each ingredient of the natural product. U.S. Pat. No. 4,504,515, in another approach, prepares low-fat meat products by combining high levels of skimmed milk or whole milk with comminuted lean meat. A low-cholesterol sausage analog of the ground meat type using egg white as the heat-denaturable binder system is described in U.S. Pat. No. 4,376,134.

In another aspect of the prior art, meat analogs, such as bacon and sausage analogs, have been prepared by preparing separate phases, one for the fat phase and a second lean meat phase and by then combining these phases to provide a completed product. The intent here is to prepare analogs of the respective lean and fat portions of the natural meat product and to then combine them. In the case of bacon, for example, as described in U.S. Pat. No. 4,143,164, two separate phases are prepared, joined together by layering, and the layered mass is subsequently heat-set to form the final product. According to the patent, the fat phase analog is an aqueous matrix of a heat-coagulable protein from the group consisting of egg albumen and blood albumen, together with a water-soluble film-forming component such as gelatin. The matrix has a fat component dispersed therein as fine droplets. The fat phase analog in the example contains about 24% water and about 47% oil, the balance being egg albumen, flavour, colour and 2% gelatin. The fat is dispersed in a continuous matrix containing the gelatin and heat-coagulable protein, and the stability of the fat dispersion depends upon the coagulating action of the heat employed during processing. EP 325 315 discloses the preparation of emulsion-type meat products by using a discontinuous phase consisting of particles of water and oil emulsion.

Other attempts have been made to prepare low-fat products utilizing technology which forces meat protein to bind increased quantities of water or which entail the use of cereal protein and/or carbohydrate extenders to act as agents which bind larger quantities of water in the product. The resulting products generally have an unacceptable texture and taste, being either overly wet or mealy in nature.

EP 298 561 discloses the preparation of edible dispersions containing at least two gelling agents which form at least two condensed phases. Said dispersions may for example be used in pâtés.

EP 437,360 discloses the use of chemically set (hence not thermo-reversible) alginate microspheres which may for examples be used in meat products.

EP 290,251 relates to thermo-irreversible aqueous gels containing xanthan gum and glucomannan gum. The gels may be used in food products.

EP 50,006 discloses thermo-irreversible gels containing a mixture of glucomannan and carrageenan. Again the product may be used in meat analogues.

It is an object of the present invention to provide meat products which have a desirable appearance, taste, texture and cooking performance, said meat products comprising at least two separate phases, one of these being a meat phase. The second phase is based on water in combination with gelling agents. In the rest of this specification this second phase will be referred to as the aqueous phase.

Meat products comprising a meat phase and an aqueous phase, often have one or more of the following problems:

(a) they are not of satisfactory succulence, for example after cooking;
(b) they show unacceptable shrinkage upon cooking, caused by leaking out of the aqueous phase upon heating;
(c) they are difficult to prepare, because the aqueous phase is difficult to incorporate into the meat phase;
(d) they taste rubbery;
(e) they have a less satisfactory appearance;
(f) they require expensive ingredients and/or expensive processing routes for preparing the product;
(g) they have a less satisfactory flavour;
(h) the viscosity of the aqueous phase is not always favourable to the products and their uses, where they are incorporated;
(i) the aqueous phase is not capable of satisfactory improvement of the textural properties of the product;
(j) the aqueous phase does not release water on the point most appropriate (e.g. the aqueous phase releases water at cooking rather than during eating);
(h) the product has a less satisfactory freeze-thaw stability.

Surprisingly it has been found that one or more of the above problems can be solved if a specific aqueous phase is used. Aqueous phases of the invention contain at least two gelling agents, each having a gel-melting temperature of more than 40° C. and less than 150° C. The resulting aqueous phase containing these gelling agents melting between 40° C. and 150° C. will hence be thermo-reversible. In a particularly preferred embodiment of the invention the aqueous phase contains at least two gelling agents, said gelling agents forming at least two gelled (micro)phases and each of these gelling agents having a gel-melting temperature of at least 40° C., and less than 150° C.

Aqueous phases comprising the gelling agents as specified above generally have one or more of the following advantageous properties: They are elastic and/or rigid and/or they possess other useful physical properties at processing temperatures (for example the temperature at which the material is reduced in size prior to combining with the meat phase) to allow good processing; they are viscous but not fully liquid at cooking temperatures (for example 100° to 130 ° C.) to avoid excessive leaking of the product upon cooking; they have a firm structure at eating temperatures (35° to 50° C.) to provide a good succulent taste.

A further possible advantage of the invention is that the aqueous phase can be used as particulate material having sufficient physical strength to contribute to the structure and therefore of the perceived texture of the meat products in which they are incorporated. This is particularly relevant to those products in which some or all of the fat is present as adipose tissue and where part or all of this fat may be replaced by said aqueous phase.

SUMMARY OF THE INVENTION

Accordingly the invention relates to a meat product comprising a meat phase and an aqueous phase, said aqueous phase comprising at least two gelling agents, each having a gel-melting temperature of at least 40° C. and less than 150° C.

For the purpose of the present invention meat products are food products containing a significant level of animal tissue or substitutes therefor. The animal tissue may for example be derived from pork, beef, poultry, game, fish and mixtures thereof. Meat substitutes can for example be structured vegetable proteins, for example soy protein or myco-protein, having a similar food function as animal tissue.

DESCRIPTION OF PREFERRED EMBODIMENT

In a preferred embodiment of the invention the animal tissue or substitute therefor is present in the product in comminuted or ground form, such as for example in pate, sausages, hamburgers, fish, poultry and other products in which meat exists in pieces of considerable size etc. Other possible products include meat sauces, for example meat stew or ragout.

Meat products according to the present invention comprise a meat phase and an aqueous phase. These phases may be present in any suitable form, e.g. as a discrete or as a continuous phase. Examples of suitable products include: a discrete meat phase, dispersed in a continuous aqueous phase; a discrete meat phase combined with a discrete aqueous phase; a discrete aqueous phase dispersed in a continuous meat phase; and a continuous meat phase combined with a co-continuous aqueous phase. Preferably the particle size ($D_{3,2}$) of the aqueous phase, if discrete, is from 0.1 to 10,000 μm, for example from 1 to 8,000 μm or 500 to 5,000 μm.

Preferably the meat phase and the aqueous phase are used in a weight ratio of about 20:1 to 1:10, more preferred 15:1 to 1:2, most preferred 8:1 to 1:1.

The meat phase may contain in addition to animal tissue or a substitute any ingredient which may be present in meat products, such as salt, spices, fat, preservatives, colouring, flavouring and water. The balance of the meat phase is animal tissue or a substitute therefore, preferably animal tissue.

Preferably the animal tissue present is of relatively low fat content e.g. lean beef, lean pork, poultry meat, fish etc. Especially preferred is the use of beef, pork or white meat such as chicken or turkey.

Preferably the level of animal tissue in the product is more than 10 wt %, more preferred more than 20 wt %, or more than 30 wt % and less than 90 wt %, more preferred less than 80 wt %, most preferred less than 70 wt %.

The aqueous phase of the meat products according to the invention comprise at least two gelling agents, each having a gel-melting temperature of at least 40° C, more preferred more than 45° C., most preferred more than 50° C. The gel-melting temperature will be less than 150° C., more preferred less than 120° C., most preferred less than 100° C. For the purpose of the invention gel-melting temperature can be measured by any suitable method. For example the gel-melting temperature may be determined by preparing an aqueous gel containing the gelling agent at a concentration above the gel-forming concentration, followed by measuring the melting temperature thereof by conventional techniques.

Suitable gelling agents may for example be selected from the group of a carbohydrate gelling agents such as pectin, alginate, carageenan, hydrolysed starches etc. In a preferred embodiment of the invention one of the gelling agents is a polysaccharide, e.g. selected from the group of pectin, alginate, agar, fucelleran, gellan, iota- and kappa-carageenan. The other gelling agent is preferably a starch, for example a modified starch, a crosslinked starch, a hydrolysed starch, a cellulose or a cellulose derivative or a debranched amylopectin, more preferably a low DE (less than 5) maltodextrin, e.g. Paselli SA2 or N-Oil or a debranched amylopectin is used. Especially preferred are mixtures of a starch selected from hydrolysed starch and cross-linked starch in combination with a polysaccharide selected from alginate, agar, iota-carrageenan, kappa-carrageenan and furcelleran. If carrageenan is used, preferably a mixture of iota- and kappa-carrageenan is used, for example in a weight ratio of 5:1 to 1:5.

Preferably the level of each gelling agent (based on the weight of the aqueous phase) is from 0.1 to 30 wt %, more preferred 1 to 20 wt %. If starches are used, their level is preferably 5 to 25 wt % based on the weight of the aqueous phase, more preferred 7 to 20 wt %. Other gelling agents such as polysaccharides are preferably used at a level of 0.1 to 10 wt % based on the aqueous phase, more preferred 0.5 to 7 wt %, most preferred 1 to 5 wt %.

The levels of gelling agents are preferably taken such that the aqueous phase is gelled, e.g. at least one of the gelling agents is present in a concentration above its critical concentration. More preferably both gelling agents are present in an amount above their critical concentration. For the purpose of the invention the critical concentration can be determined by any suitable technique, for example as described in EP 298 561.

Especially preferred is the combined use of carageenan and hydrolysed starch. The level of hydrolysed starch (based on the weight of the aqueous phase) being 1 to 12 wt %, the level of carageenan being 0.2 to 4 wt %

In a preferred embodiment of the invention, the two gelling agents form at least two distinct gelled (micro)-phases within the aqueous phase. In this context the word microphase refers to a phase structure within another phase structure: i.c. the total product comprises a meat phase and an aqueous phase, while the aqueous phase in turn comprises at least two distinct phases formed by the gelling agents. For example the aqueous phase may contain a dispersed phase of one of the gelling agents (optionally in combination with small amounts of the other gelling agent(s)) and one continuous phase containing a second gelling agent (optionally in combination with small amounts of the other gelling agent(s)). Or both of the phases may be continuous. Such so-called "filled-gel" systems are described in EP 298 561.

One preferred embodiment of the invention concerns meat products which have a reduced calorific contents as compared to normal full-fat meat products. Preferably the caloric reduction is at least 25%, more preferred from 30-90%. Preferably the total fat level of meat products of the invention is less than 20 wt %, more preferred from 0 to 15 wt %, most preferred from 2 to 12 wt %.

In another preferred embodiment of the invention the aqueous phase is used as a succulence enhancer and/or for textural contribution and/or for visual contribution. The aqueous phase may for example contribute to the lubrication and/or juiciness in the mouth. Such a functionality is especially preferred when the meat phase is derived from meat having a relatively low intrinsic fat level, for example poultry or fish.

Another preferred element of the present invention is the presence of bulk regions of the meat phase and the aqueous phase in meat products of the invention. Bulk phases preferably consist of either a more or less continuous phase or of discrete particles of said phase, for example having a $D_{3,2}$ particle size of between 100 μm and 10,000 μm, preferably between 200 μm and 5,000 μm. The bulk regions of aqueous phase may advantageously be used for replacing the fat-phase (or white phase) of meat products like sausages or the matrix phase of white meat products such as fish or poultry products.

Particularly preferred embodiments of the invention, therefore relate to sausages comprising a lean meat phase and an opaque or white aqueous phase. Another preferred embodiment of the invention relates to fish or poultry products containing fish or poultry in combination with an opaque or white aqueous phase. The appropriate colour of the aqueous phase can be achieved by any suitable method, e.g. the addition of scattering particles, colouring materials etc.

The aqueous phase may contain in addition to the above mentioned gelling agents any ingredient which may be present in meat products, such as salt, spices, fat, preservatives, proteins, milk, colouring, flavouring etc. Generally the balance of the aqueous phase will be water, which may for example be present at levels of up to 99.8 wt % based on the weight of the aqueous phase, more general the water level in the aqueous phase will be from 20 wt % to 98 wt %, such as 70 wt % to 95 wt %. The water may be incorporated as such in the aqueous phase or be added as part of another ingredient, for example as a dairy fluid such as milk, buttermilk, yoghurt etc.

For preparing meat-products containing the aqueous phase in accordance to the invention, it is possible to prepare the aqueous phase separately and add this phase as an ingredient to the other ingredients of the product. Suitable methods for the preparation of preferred aqueous phases in accordance to the invention are disclosed in EP 298 561. Also it may sometimes be possible to prepare the aqueous phase of "in-situ" in the presence of one or more other ingredients of the composition, for example during grinding.

Generally however a preferred process for preparing products in according to the invention involves the separate preparation of an aqueous phase, followed by reducing the particle size of the aqueous phase, e.g. by bowlchopping, followed by combining the aqueous phase with a meat phase. The invention will be further illustrated by means of the following examples. Unless specified otherwise, all percentages are weight percentages.

EXAMPLE I

An aqueous phase of the following composition was prepared:

| | |
|---|---|
| whole milk | 90 wt % |
| hydrolysed starch (Paselli SA2) | 7 wt % |
| Carrageenan* | 2 wt % |
| Salt | 1 wt % |

*A 50/50 (wt) mixture of iota- and kappa-carrageenan (Genugel X6955 and X6960).

The phase was prepared by dissolving the hydrolysed starch and the salt in the milk at a temperature of 85° C., followed by addition of the carrageenan. The mixture was subjected to high shear in a mixing device of the Silverston type until the gelling agents were dispersed and hydrated. The mixture was cooled to 65° C., filled into tubs and stored overnight in a refrigerator.

EXAMPLE II

A pâte can be prepared from the following ingredients:

| Ingredient (wt %) | Pâté | Crème pâté |
|---|---|---|
| Pork liver | 28.60% | 22.00% |
| Pork fat | — | 15.00% |
| Pork meat | — | 16.00% |
| Pork bellies | 20.00% | — |
| Water | 14.88% | 10.17% |
| Wheat starch | 3.00% | — |
| Butter | — | 2.40% |
| Milkpowder | — | 0.86% |
| Curing salt (NaNO$_2$) | 1.50% | 1.61% |
| Dextrose | 1.00% | — |
| Sugar | — | 0.40% |
| Onions | 0.52% | 0.46% |
| Ansjovis | — | 0.29% |
| Egg powder | — | 0.43% |
| Sodium ascorbate | — | 0.03% |
| Spices | 0.50% | 0.35% |
| Aqueous phase (as in Example I) | 30.00% | 30.00% |

The formulations are prepared in a bench scale "STEPHAN" steam jacked bowlchopper. Total formulations weight about 3.0 kg. The method of manufacture is as follows:

Liver, curing salt and spices are chopped until a fine comminute at a temperature of 15° C. The jacketed bowl is heated to 48° C. and the preheated other meat ingredients are added together with the remaining ingredients except for the aqueous phase. After forming, the aqueous phase of example I is chopped in a bowlchopper at 40°-45° C. The emulsion is deaerated and filled into metal cans at a net weight of 215 g. To create a shelf life of at least 18 months at ambient the cans can be sterilised at 114° C. for 65 minutes.

The resulting products has a reduced fat content, reduced cholesterol level and reduced caloric content as compared to standard pâtes. Despite this the product is of good taste, spreadability and juiciness.

EXAMPLE III

Frankfurters can be prepared from the following ingredients:

|  | Comparison wt % | inventive wt % |
|---|---|---|
| Lean beef | 16.00% | 16.00% |
| Pork meat | 42.00% | 51.00% |
| Fat pork meat | 29.00% | — |
| Water | 10.00% | 10.00% |
| Curing salt (Na NO$_2$) | 2.00% | 2.00% |
| Poly phosphates | 0.40% | 0.40% |
| Sodium ascorbate | 0.05% | 0.05% |
| Spices | 0.55% | 0.55% |
| Aqueous phase (of Example I) | — | 20.00% |

The formulations are prepared in a bench scale "STEPHAN" bowlchopper. Total formulation weight about 3 kg. The ingredients are comminuted at 8°–10° C. to a stable slurry and deaerated at the end of the mixing. The meat dough is stuffed in a cellulose casing with a diameter of 20 mm. After stuffing and linking the sausages links are predried at 60° C. for 60 minutes at 60% relative humidity, smoked at 60° C. for 15 minutes of 75° C. relative humidity and cooked in the casing for 15 min. at 80° C.

After removing the casing the sausages are vacuum packed and in pack pasteurised at 90° C. for 60 minutes.

Both the comparative product as well as the aqueous phase containing sausages show a good stable emulsion quality, taste and juiciness. The product of the invention, however, contains a significant lower level of fat.

EXAMPLE IV

Hamburgers can be prepared as follows:

COMPOSITION OF BURGERS

| Beef Burger | Reference | A |
|---|---|---|
|  | parts by weight | |
| Lean beef | 73.5 | 78.0 |
| Pork back fat | 25.5 | 9.0 |
| Salt | 0.7 | 0.7 |
| Curafos 7000 (polyphosphate) | 0.2 | 0.2 |
| White pepper | 0.1 | 0.1 |
| Aqueous phase (Of Example I) | — | 12.0 |

| Onion burger | Reference | B |
|---|---|---|
|  | parts by weight | |
| Lean beef | 67 | 74 |
| Pork back fat | 16 | 7 |
| Chopped onion | 10 | 10.9 |
| Water | 1.8 | 2 |
| Rusk | 4.5 | 5 |
| Salt | 0.7 | 0.678 |
| White Pepper | trace | trace |
| Aqueous phase (example I) | 0 | 12 |

| Lean Minced Burger | Reference | C | D |
|---|---|---|---|
|  | parts by weight | | |
| Lean beef | 500 | 450 | 400 |
| Aqueous phase (example I) | 0 | 50 | 100 |
| Salt | 3.5 | 3.5 | 3.56 |
| White pepper | 0.5 | 0.5 | 0.5 |

The products can be prepared as follows. Lean beef and pork fat are minced separately in a Bizerba (type) meat mincer, equipped with an outlet plate with 5 mm holes. The temperature of meat and fat is kept at 2° to 4° C. Minced meat, minced fat, aqueous phase and all other ingredients are mixed in a Kenwood household mixer, at 4° C., and the mix formed into burgers, 10 cm diameter and approximately 100 g units, using a hamburger shaper. The burgers are packed in Alu-foil sachets and frozen in a freeze cabinet at −25° C. They remain stored at −25° C. until used.

The burgers can be cooked after 24 hrs frozen storage. They are shallow fried directly from the freezer in butter (30 g for 4 burgers); starting at 135° C. for 8 to 10 minutes turning the burgers at intervals.

EXAMPLE V

A turkey spread of the following ingredients can be prepared:

| Ingredient (wt %) | |
|---|---|
| Turkey-meat | 56% |
| Aqueous phase | 24% |
| ice/water | 18% |
| salt | 0.5% |
| spices | 0.4% |
| milk protein | 1.0% |
| Na-monoglutamate | 0.1% |

The spread can be prepared by heating the turkey meat to 70° C. while cutting, followed by addition of the dry ingredients, the ice/water mixture and the aqueous phase (as in example I). The cutting is continued until a homogeneous spread like product is obtained. The resulting product is of reduced fat-content as compared to standard poultry spreads, but has nevertheless a good, juicy taste.

EXAMPLE VI

A fish-spread can be prepared from the following ingredients.

| Ingredient wt % | |
|---|---|
| Cod | 25% |
| mackerel | 20% |
| sea-salmon | 25% |
| ice/water | 18% |
| aqueous phase | 8.5% |
| salt | 1% |
| spices | 0.4% |
| Na-monoglutamate | 0.1% |
| milk protein | 2% |

The spread is prepared by heating the fish to 70° C. while cutting, followed by addition of the dry ingredients, the ice/water mixture and the aqueous phase (as in example I). The cutting is continued until a homogeneous spread like product is obtained. The resulting product is of reduced fat-content as compared to standard fish spreads, but has nevertheless a good, juicy taste.

EXAMPLE VII

Low fat sausage

The composition of the sausage was as follows:

|  | wt % |
|---|---|
| First Phase | |
| soy isolate | 0.75 |
| lean pork | 21 |
| ice/water | 12 |

-continued

|  | wt % |
|---|---|
| salt | 0.75 |
| *Second phase* | |
| minced chicken meat | 10 |
| degristled lean pork | 21.5 |
| lactose | 1 |
| ice/water | 7.77 |
| colour | 0.03 |
| seasoning | 2.2 |
| rusk | 11 |
| aqueous phase (example 1) | 12 |
|  | 100 |

The first phase was prepared by adding the ice-water to a bowl mixer followed by adding the soya isolate under slow mixing. The lean pork was added after 2 minutes of mixing, 30 seconds later the salt was added. The entire mix was mixed for 4 minutes at high speed. The mix was cooled to 0° C.

The final product was prepared by slowly mixing the first phase while adding the lactose and seasoning. After 45 seconds the water/ice was added followed by slow mixing for one minute. The aqueous phase was added and mixing continued for 30 seconds after which the minced chicken and the rusk were added. The blade speed was increased to "mixing" after which the degristled lean pork was added. Mixing continued for 90 seconds.

The resulting sauces had an improved taste and appearance on cooking as compared to a full fat sausage.

We claim:

1. A meat product comprising a meat phase and an aqueous phase, said aqueous phase comprising at least two gelling agents, the first gelling agent being a starch and the second gelling agent being selected from the group consisting of pectin, alginate, agar, furcelleran, gellan, iota-carrageenan, kappa-carrageenan and mixtures thereof, wherein the gelling agents form at least two distinct gelled phases, each of said gelling agents having a gel melting temperature of at least 40° C. and less than 150° C.

2. A meat product according to claim 1 wherein the starch gelling agent is selected from the group consisting of a modified starch, a cross-linked starch, a hydrolyzed starch, a cellulose or a cellulose derivative, a debranched amylopectin, a low DE maltodextrin and mixtures thereof.

3. A meat product according to claim 1 wherein the starch gelling agent is selected from the group consisting of a hydrolyzed starch and a low DE maltodextrin.

4. A meat product according to claim 1 comprising the meat phase and the aqueous phase in a weight ratio of 20:1 to 1:10.

5. A meat product according to claim 1 wherein the aqueous phase comprises from 0.1 to 30 wt. % of gelling agents.

6. A meat product according to claim 1 wherein the aqueous phase is opaque.

7. A meat product according to claim 1 wherein the meat phase is derived from beef or pork.

8. A meat product according to claim 1 wherein the meat phase is derived from poultry or fish.

* * * * *